US012627704B2

(12) United States Patent
Einbender et al.

(10) Patent No.: US 12,627,704 B2
(45) Date of Patent: May 12, 2026

(54) SYSTEMS AND METHODS FOR ACCESS CONTROL

(71) Applicant: Home Depot Product Authority, LLC, Atlanta, GA (US)

(72) Inventors: Steven Einbender, Atlanta, GA (US); Alfred Hartmann, Round Rock, TX (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 18/761,613

(22) Filed: Jul. 2, 2024

(65) Prior Publication Data

US 2026/0012474 A1     Jan. 8, 2026

(51) Int. Cl.
*H04L 9/40*          (2022.01)

(52) U.S. Cl.
CPC .......... *H04L 63/1433* (2013.01); *H04L 63/20* (2013.01)

(58) Field of Classification Search
CPC ............................ H04L 63/1433; H04L 63/20
See application file for complete search history.

(56) References Cited

U.S. PATENT DOCUMENTS

| | | | |
|---|---|---|---|
| 2016/0364741 A1 | 12/2016 | Zamer | |
| 2017/0230417 A1* | 8/2017 | Amar | H04L 63/20 |
| 2022/0345484 A1* | 10/2022 | Drozd | H04W 4/40 |
| 2025/0080542 A1* | 3/2025 | Cannizzaro | H04L 63/20 |

FOREIGN PATENT DOCUMENTS

CN      113901499 A      1/2022

OTHER PUBLICATIONS

Zscaler, Inc., Zero Trust Cloud Connectivity, accessed Oct. 2023, 7 pp.
International Search Report and Written Opinion of application No. PCT/US2025/036052, dated Sep. 16, 2025, 10 pp.

* cited by examiner

*Primary Examiner* — Noura Zoubair
(74) *Attorney, Agent, or Firm* — Greenberg Traurig, LLP

(57)          ABSTRACT

A computer-implemented method for access control includes detecting, by a security agent of a computing device, a request by a user of the computing device for access to a controlled asset. The method also includes authenticating, by the security agent, the user in response to the request. The method includes granting, by the security agent, access to the controlled asset based on determining that an initial risk score for the authenticated user does not exceed a predetermined threshold. Additionally, the method includes periodically calculating, by the security agent using at least one security policy and at least one machine learning model, an updated risk score of the authenticated user based on a behavior of the user. The method further includes performing a security action in response to determining the updated risk score exceeds the predetermined threshold. Various other methods, systems, and computer-readable media are also disclosed.

17 Claims, 7 Drawing Sheets

100

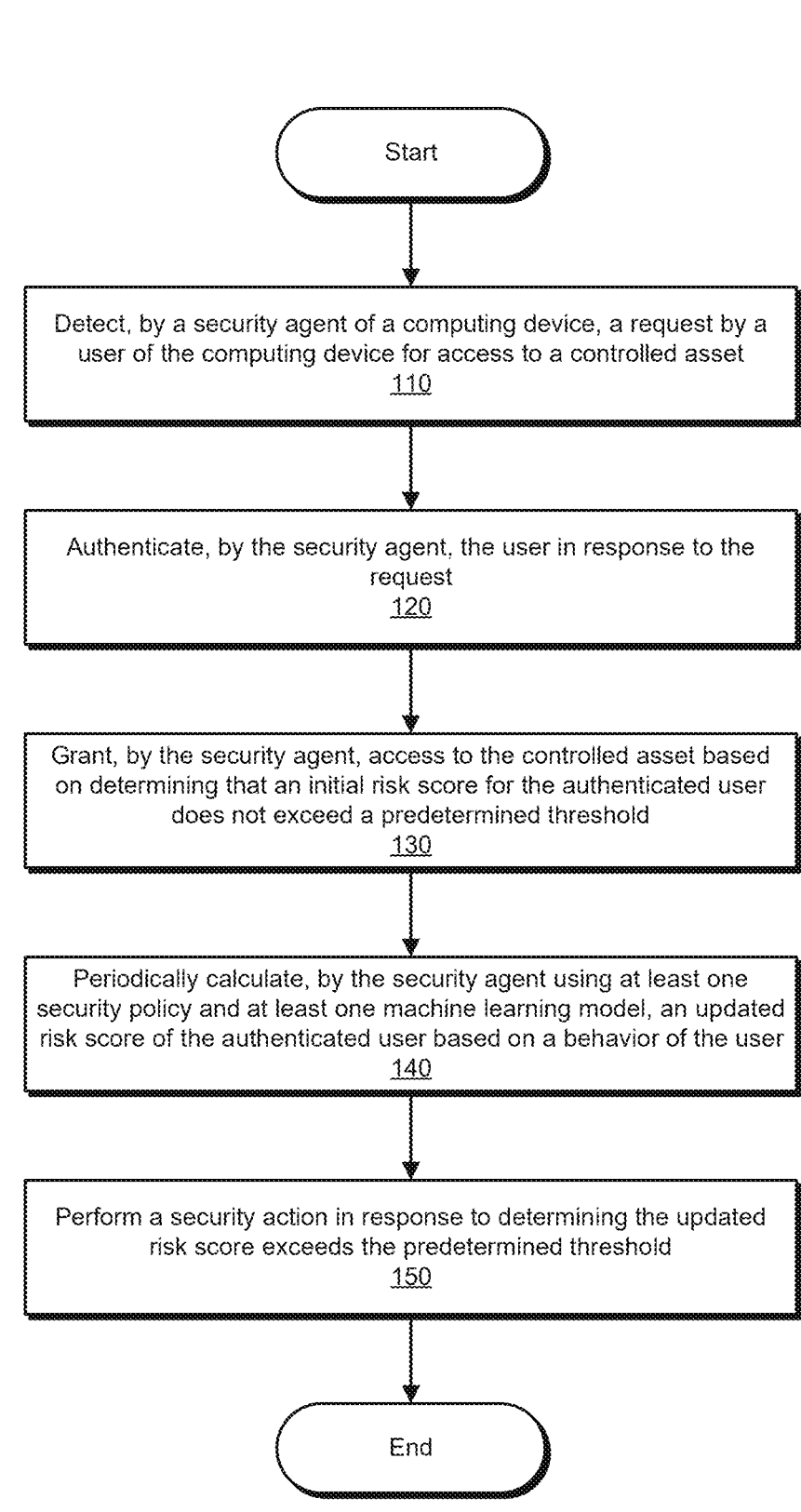

Start

Detect, by a security agent of a computing device, a request by a user of the computing device for access to a controlled asset
110

Authenticate, by the security agent, the user in response to the request
120

Grant, by the security agent, access to the controlled asset based on determining that an initial risk score for the authenticated user does not exceed a predetermined threshold
130

Periodically calculate, by the security agent using at least one security policy and at least one machine learning model, an updated risk score of the authenticated user based on a behavior of the user
140

Perform a security action in response to determining the updated risk score exceeds the predetermined threshold
150

End

FIG. 1

SYSTEMS AND METHODS FOR ACCESS CONTROL

TECHNICAL FIELD

This disclosure generally relates to zero trust access control of managed assets over time, given the behavior of authenticated users, using a combination of security rules and policies and trained machine learning models.

BACKGROUND

In controlled computing systems with potentially sensitive data or risky resources, users need to be authenticated and verified as having appropriate permissions. For example, a financial institution may require users to log in with security information, such as a password, to verify the user's identity. For tightly controlled systems, zero trust security may require all users to be authenticated and validated to determine whether each user has authorization to access data or resources. In other words, the system does not trust any users implicitly, and zero trust access controls are applied to control each user's access. Users that fail authentication may be blocked from accessing the system or resources.

BRIEF DESCRIPTION OF THE DRAWINGS

FIG. 1 is a flow diagram of an example method for zero trust access control.

DETAILED DESCRIPTION

Figure 2:
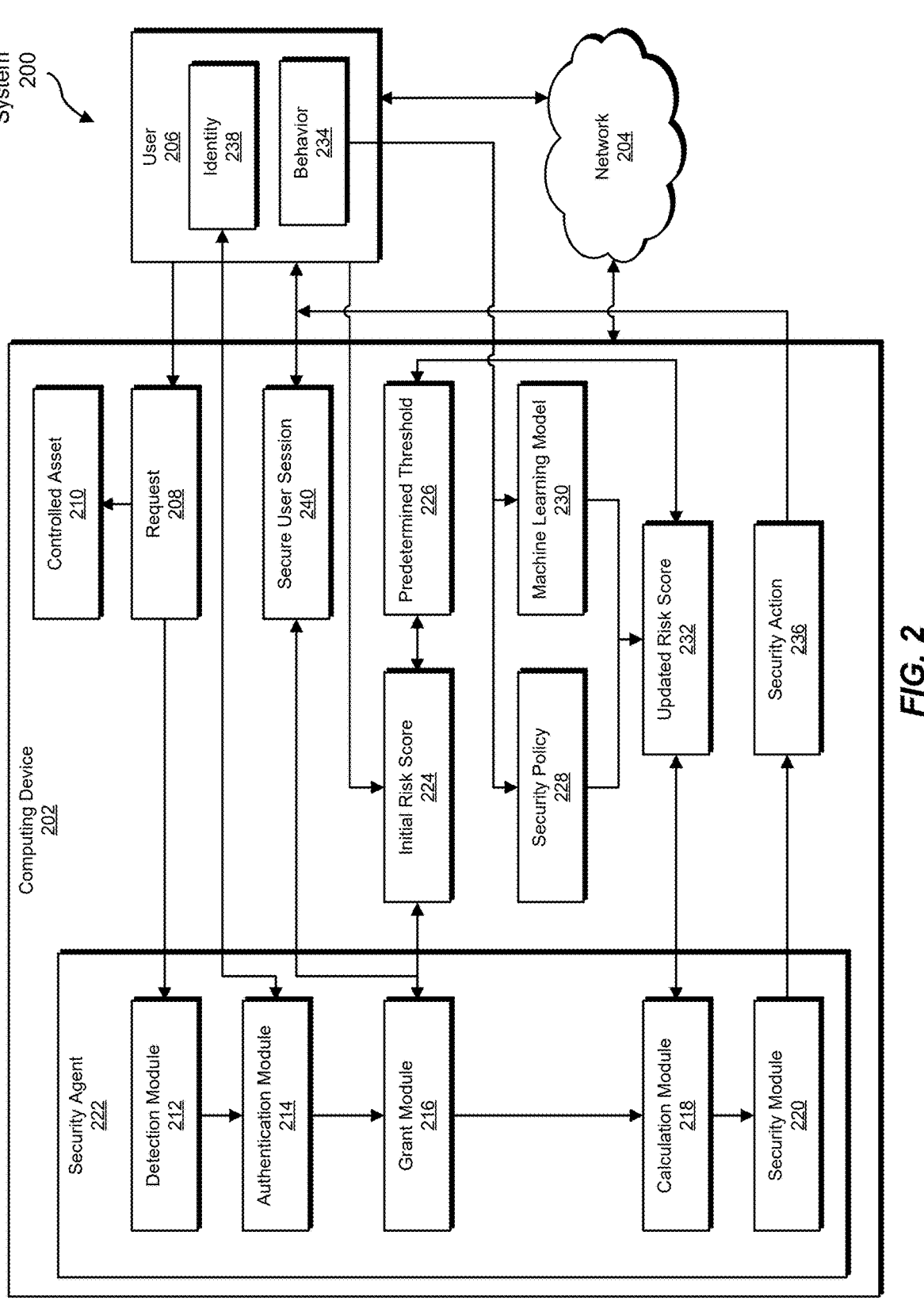
FIG. 2 is a block diagram of an example system for zero trust access control.

Zero trust security controls access to data and resources for all users of a system. Conventional approaches can authenticate users or verify system access at a specific point in time, usually when access is first requested. These approaches may use pre-established authentication and authorization processes to determine the identity of users. For example, access may be granted based upon the authenticated identity and its authorized privileges. Authorized privileges can be assigned to each identity, and systems can retrieve this information from an account directory. Methods to authenticate users may be considered identity controls.

Conventional systems often do not reassess security over time and may be based on only verifying user identify. For example, access that is granted to a particular user account may be time-bounded and limited, but users are typically not continuously re-assessed. These are often point-in-time decisions that only assess the initial login. However, identity controls may be weak against breaches of identifying data. For example, user accounts may be subjected to stolen identities, compromised credentials, malicious insiders, or compromised systems that subvert the authorized intent. This can lead to previously-authenticated users posing a threat to the system or to the controlled assets. Thus, better methods of continuously controlling user access are needed.

Various embodiments of the present disclosure relate to systems, computer-implemented methods, and non-transitory computer readable media for zero trust access control. Using a security agent residing on an endpoint device, the disclosed embodiments may enable continuous and dynamic observation and analysis of user and endpoint activity. Then, the security agent may calculate an aggregated risk score for user behavior based on a combination of security policies and trained machine learning models. In addition, the security agent can determine that particular behavior or activity during a user session is a potential risk, based on the risk score, and subsequently perform various security actions to mitigate the risk. For example, the disclosed systems may dynamically revoke user access to a controlled asset in real time or change user account privileges. Thus, the security agent continuously performs a loop of observation, analysis, and restriction.

Various embodiments of the present disclosure provide improvements to conventional approaches by adding a layer of security protection through continuous monitoring of authenticated users. Rather than only authenticating a user during an initial access request, the disclosed methods can provide an aggregated risk score associated with the initial access request as well as with continuous monitoring and risk assessment of the connection to a controlled asset. The security agent can use the calculated risk score to determine whether to approve the initial access request. The security agent can then continue to monitor and assess the risk score to determine whether to revoke the access. During a connected session, the disclosed systems may assess risk in near real-time, such as by periodically calculating a new risk score using the most recent behavior data in addition to evaluating user behavior for longer time periods. In addition, the disclosed systems may use a sliding time window to evaluate changes in behavior over time. More frequent calculations of risk scores may reduce latency in responding to risk.

In various embodiments of the present disclosure, multiple analytical methods can be used in conjunction with each other to more accurately assess a total risk of a user's behavior. For example, by using a diverse combination of various methods, the disclosed embodiments may more effectively include different types of behavior and, therefore, provide better risk assessment. As another example, the combination of analyses based on security rules and policies and on machine learning predictions of risk may reduce false positives that inaccurately flag non-malicious behavior. In other words, the disclosed systems may add a layer to the identity domain controls to assess behavioral domain controls for zero trust access security and dynamically allow or disallow information asset access. These embodiments may evaluate security both at the initial request as well as throughout the connected session to enforce continuous compliance with expected behavior patterns and risk tolerances. The various embodiments do not rely upon identity authentication for its determinations and may be immune to attacks such as identity spoofing, identity fraud, or insider identity abuse. Thus, the various embodiments cannot be evaded by point-in-time authentication exploits.

Referring to the drawings, wherein like numerals refer to the same or similar features in the various views, FIG. 1 is a flow diagram of an example method for zero trust access control, in accordance with various embodiments. The steps shown in FIG. 1 may be performed by any suitable computer-executable code and/or computing system, including system 200 illustrated in FIG. 2. In one example, each of the steps shown in FIG. 1 may represent an algorithm whose structure includes and/or is represented by multiple substeps, examples of which will be provided in greater detail below.

As illustrated in FIG. 1, at step 110, one or more of the systems described herein may detect, by a security agent of a computing device, a request by a user of the computing device for access to a controlled asset. For example, FIG. 2 is a block diagram of an example system 200 for zero trust access control, in accordance with various embodiments. As illustrated in FIG. 2, a detection module 212 may, as part of a security agent 222 of a computing device 202, detect a request 208 by a user 206 of computing device 202 for access to a controlled asset 210.

Figure 3:
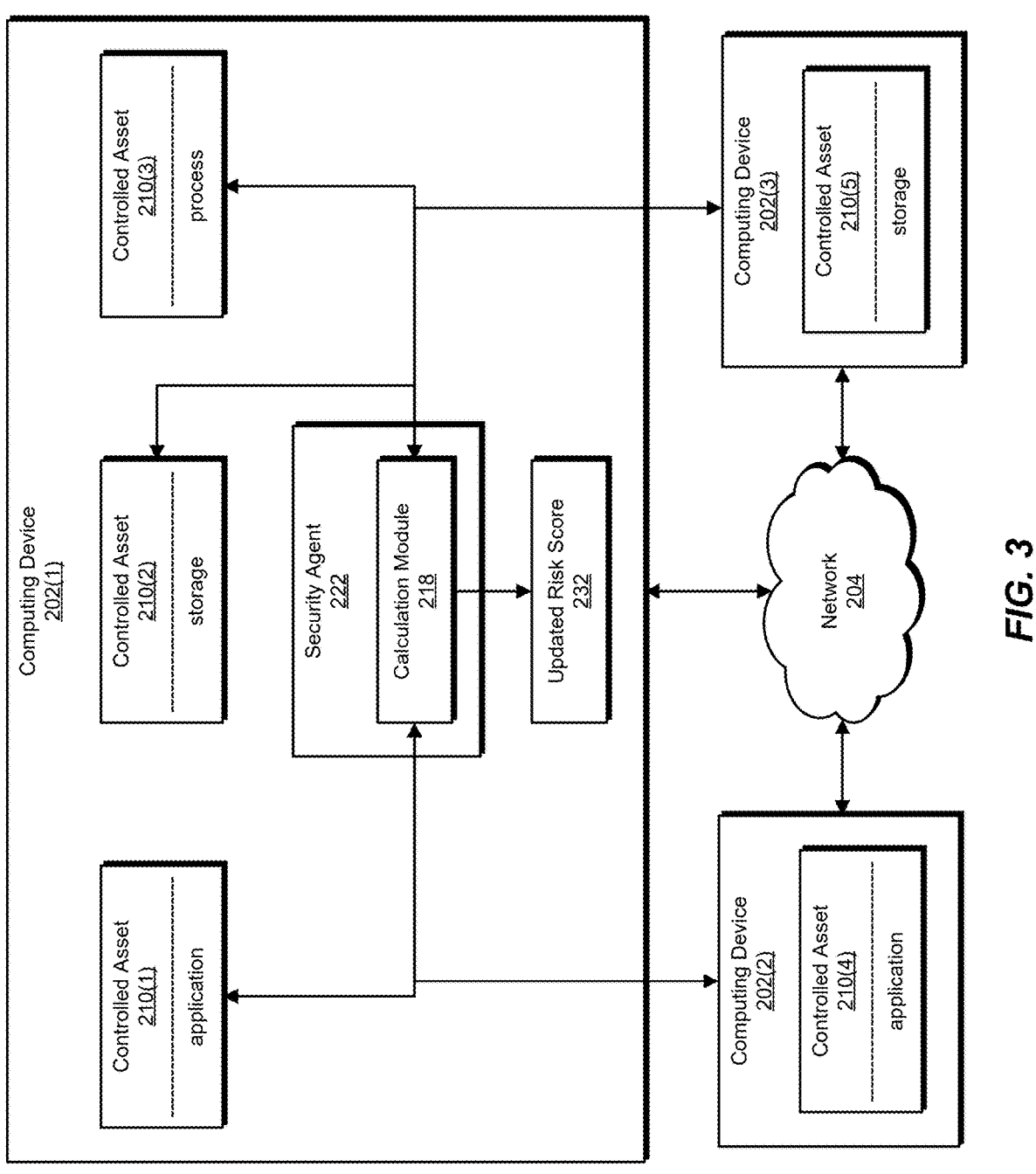
FIG. 3 is a block diagram of an example system for monitoring controlled assets.

The systems described herein may perform step 110 in a variety of ways. In one embodiment, controlled asset 210 may include an application, a storage, a network, a process of computing device 202, and/or a remote resource. For example, FIG. 3 is a block diagram of an example system for monitoring controlled assets, in accordance with various embodiments. As illustrated in FIG. 3, multiple computing devices 202(1)-(3) may be connected by a network 204. In this example, multiple controlled assets 210(1)-(5) may reside on computing devices 202(1)-(3).

In one example, computing device 202 of FIG. 2 and computing devices 202(1)-(3) of FIG. 3 may generally represent any type or form of computing device or server that may be programmed with the modules of FIG. 2 and/or may store all or a portion of the data described herein. For example, computing device 202 may represent a client or endpoint device capable of accessing controlled assets or data. In this example, computing device 202 may be programmed with the modules of FIG. 2 to control access to the assets and may be capable of reading computer-executable instructions. As another example, computing device 202 may represent a server that is capable of receiving, storing, and/or processing access requests for other computing devices. Examples of computing devices may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device. Additional examples of computing devices may include, without limitation, application servers and database servers configured to provide various database services and/or run certain software applications, such as communication and data transmission services.

In some embodiments, computing device 202 of FIG. 2 and computing devices 202(1)-(3) of FIG. 3 may be in communication with each other or with other computing devices via network 204. In such embodiments, network 204 may include and/or represent any medium or architecture capable of facilitating communication or data transfer. In one example, network 204 may include and/or represent wireless or wired connections. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like.

The term "security agent" may refer to a software agent that performs security actions for one or more computing devices. For example, security agent 222 may be installed on computing device 202 and may be programmed with the modules of FIG. 2 to control access to controlled asset 210 on computing device 202. In the example of FIG. 3, security agent 222 may control access to controlled assets 210(4)-(5) on other computing devices, such as by restricting a use of network 204 or communication between computing device 202(1) and computing devices 202(2)-(3).

In one embodiment, detection module 212 may detect request 208 as a request initiated by user 206. In other embodiments, request 208 may be initiated by an application used by user 206, a process or function of computing device 202, and other in response to a different action of user 206. For example, user 206 may select a function of an application that requests sensitive data stored in controlled asset 210, and security agent 222 may detect request 208 from the application.

Returning to FIG. 1, at step 120, one or more of the systems described herein may authenticate, by the security agent, the user in response to the request. For example, an authentication module 214 may, as part of computing device 202 in FIG. 2, authenticate user 206 in response to request 208.

The systems described herein may perform step 120 in a variety of ways. In some embodiments, authentication module 214 may authenticate user 206 by authenticating an identity 238 of user 206 and identifying one or more authorized privileges associated with identity 238 of user 206. In these embodiments, identity 238 of user 206 may include a personal identity of user 206, an identity of computing device 202 used by user 206, and/or a process identifier associated with user 206 using computing device 202. For example, identity 238 may include a username and password for user 206 associated with a user account for accessing computing device 202. Identity 238 may also include a machine identity that distinguishes computing device 202 from other computing devices used by user 206. In other examples, identity 238 may include a more detailed process or service, such as a user account for an application running on computing device 202. As another example, identity 238 may include a specific user session.

In some embodiments, the authorized privileges associated with identity 238 of user 206 may be assigned to and derived from identity 238, such as privileges associated with a specific user account. These authorized privileges may be stored in an account directory and retrieved during the authentication process. In these embodiments, authentication module 214 may determine user 206 is not authenticated or may not have authorized privileges for controlled asset 210. In these embodiments, authentication module 214 may then block user 206 or perform some other security action.

Returning to FIG. 1, at step 130, one or more of the systems described herein may grant, by the security agent, access to the controlled asset based on determining that an initial risk score for the authenticated user does not exceed a predetermined threshold. For example, a grant module 216 may, as part of computing device 202 in FIG. 2, grant access to controlled asset 210 based on determining that an initial risk score 224 for user 206 does not exceed a predetermined threshold 226.

The systems described herein may perform step 130 in a variety of ways. In one embodiment, grant module 216 may determine that initial risk score 224 does not exceed predetermined threshold 226 by calculating initial risk score using one or more security policies, such as a security policy 228, and one or more machine learning models, such as a machine learning model 230. In this embodiment, grant module 216 may then combine a result of security policy 228 and a result of machine learning model 230 and subsequently compare the combination with predetermined threshold 226. As used here, the term "machine learning" generally refers to a computational algorithm that may learn from data in order to make predictions. Examples of machine learning may include, without limitation, support vector machines, neural networks, clustering, decision trees, regression analysis, classification, variations or combinations of one or more of the same, and/or any other suitable supervised, semi-supervised, or unsupervised methods. In these examples, the term "machine-learning model" may refer to a model trained using machine learning techniques to make predictions.

Figure 6:
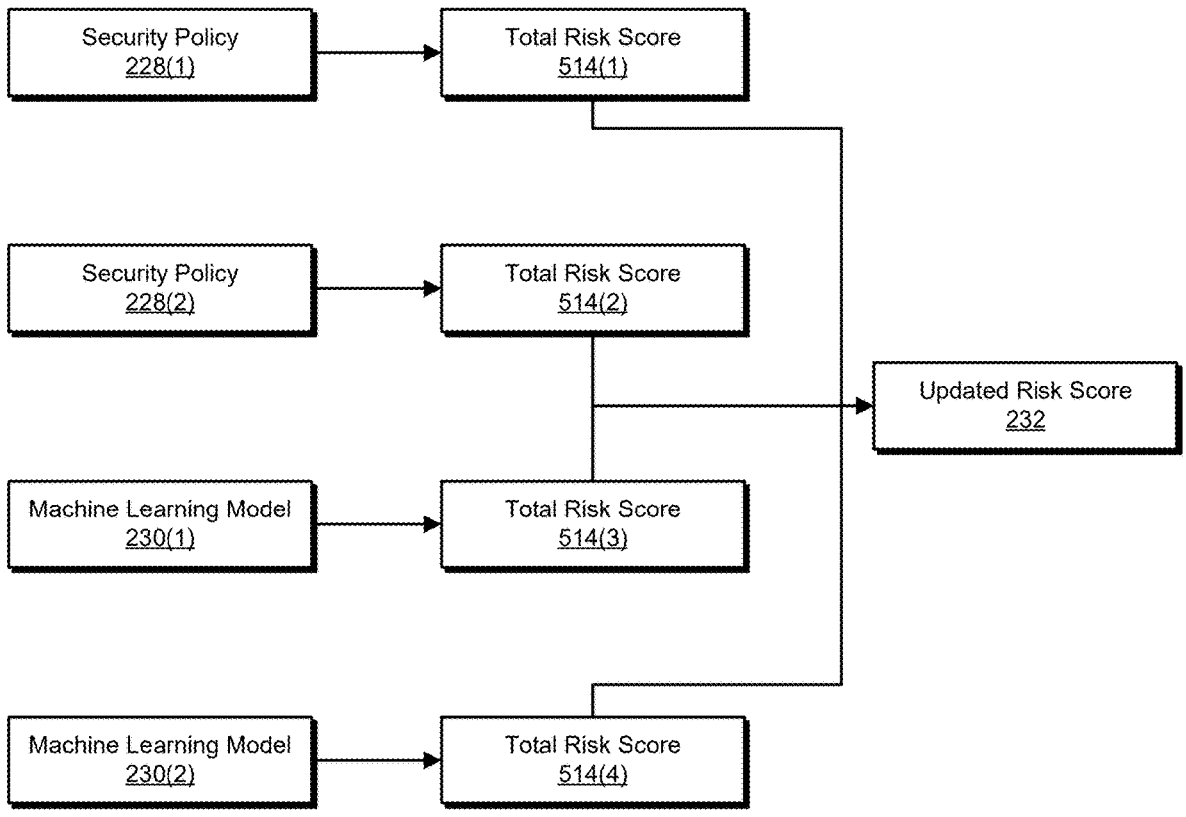
FIG. 6 is a block diagram of an example combined risk score.

For example, as illustrated in FIG. 6, security policies 228(1)-(2) and machine learning models 230(1)-(2) may result in total risk scores 514(1)-(4). In this example, total risk scores 514(1)-(4) may be combined to calculate an updated risk score 232. Similarly, grant module 216 may calculate initial risk score 224 using total risk scores 514 (1)-(4) for an initial evaluation of user 206 and request 208.

In some embodiments, grant module 216 may grant access to controlled asset 210 by establishing a secure user session 240 for user 206 on computing device 202 to access controlled asset 210. In this example, user 206 may only access controlled asset 210 during secure user session 240.

In other embodiments, grant module 216 may determine that initial risk score 224 exceeds predetermined threshold 226 or that user 206 does not have authorized privileges for controlled asset 210. In these embodiments, grant module 216 may instead deny access to controlled asset 210 and/or may perform a security action to mitigate a potential risk of user 206 attempting to access controlled asset 210.

Returning to FIG. 1, at step 140, one or more of the systems described herein may periodically calculate, by the security agent using one or more security policies and one or more machine learning models, an updated risk score of the authenticated user based on a behavior of the user. For example, a calculation module 218 may, as part of computing device 202 in FIG. 2, periodically calculate, using security policy 228 and machine learning model 230, updated risk score 232 based on a behavior 234 of user 206.

The systems described herein may perform step 140 in a variety of ways. In some embodiments, calculation module 218 may periodically calculate updated risk score 232 by monitoring behavior 234 of user 206 during secure user session 240. In these embodiments, calculation module 218 may then dynamically update initial risk score 224 based on behavior 234. In other words, security agent 222 may continuously observe and assess user 206 after establishing secure user session 240 to dynamically continue or discontinue access privilege based upon calculating a threat associated with updated risk score 232.

In some embodiments, calculation module 218 may monitor behavior 234 by monitoring a usage of an application of computing device 202, monitoring a usage of a storage of computing device 202, monitoring a usage of network 204, monitoring a usage of a process of computing device 202, and/or monitoring a usage of a remote resource. In the example of FIG. 3, security agent 222 may monitor each of controlled assets 210(1)-(5) and identify activity associated with each of controlled assets 210(1)-(5) that may be attributed to user 206. For example, security agent 222 may use various sensors or other appropriate means to detect activity accessing each of controlled assets 210(1)-(5). In some examples, security agent 222 may monitor all users and endpoint activity associated with all operating systems' process management, storage interfaces, and network interfaces. In these examples, security agent 222 may also monitor all application process activity, initiation of processes, termination of processes, storage system operations, network operations, and/or any other activity associated with managed endpoints. By monitoring such activity, security agent 222 may determine what information assets are requested or accessed by user 206, by computing device 202, and/or by application processes.

In one embodiment, calculation module 218 may periodically calculate updated risk score 232 by calculating, for each security policy and each machine learning model, a cumulative risk weight for behavior 234 of user 206 during a current time period, an average over a shifting time period, and a standard deviation over a longer time period. In this embodiment, calculation module 218 may combine the cumulative risk weight, the average, and the standard deviation into a total risk score for each security policy and for each machine learning model. In this embodiment, calculation module 218 may then combine all of the total risk scores into updated risk score 232.

Figure 5:
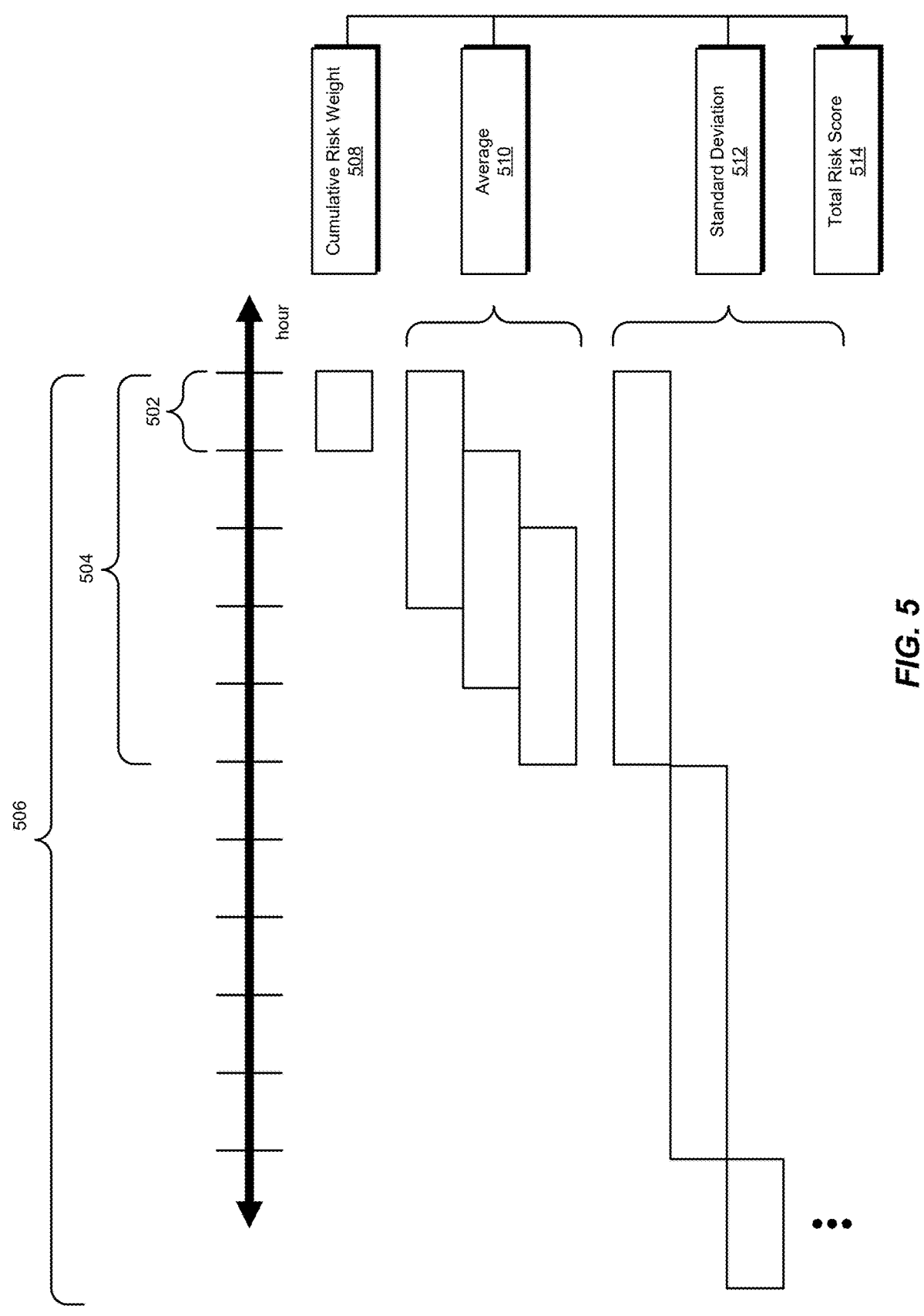
FIG. 5 is an illustration of an example total risk score derived from different example time periods.

FIG. 5 is an illustration of an example total risk score derived from different example time periods, in accordance with various embodiments. The example of FIG. 5 may represent calculation of a total risk score 514 for a single analysis metric. In the example of FIG. 5, a cumulative risk weight 508 may be calculated for a current time period 502. In this example, cumulative risk weight 508 may indicate a combined weighted risk for a number of different features or metrics. An average 510 may be calculated for a shifting time period 504. In this example, shifting time period 504 may represent a shift of a unit of time equivalent to current time period 502 or another unit of time. For example, current time period 502 may represent the most recent hour. In this example, shifting time period 504 may represent a day or a block of hours, and each shift may represent an hour. As another example, each unit of time may be an hour, and each hour may be shifted by minutes. In this example, average 510 may represent an average risk score of the shifted blocks of time, thereby encapsulating behavioral changes over time. In the example of FIG. 5, a standard deviation 512 may be calculated for a longer time period 506. For example, standard deviation 512 may capture a standard deviation over a number of days, which may provide a more robust calculation of risk.

In some embodiments, security policy 228 may include a set of rules for risk assessment and/or advanced analytics that apply behavioral context to the set of rules for risk assessment. For example, security policy 228(1) of FIG. 6 may include the set of rules for risk assessment, with each rule applying to the behavior of an application process on computing device 202 within an analytical time period, such as current time period 502. By dividing analysis of behavior in time periods, calculation module 218 may create a stratification of behavior that enables use of statistical functions to optimize modeling. By applying a rule of security policy 228(1), calculation module 218 may determine a binary condition indicating whether the rule is fulfilled, which may then be used to create a set of descriptive statistics over time. For example, total risk score 514(1) may indicate that a suspicious protocol that has been executed a number of times within current time period 502 indicates a potential risk due to a comparison with frequency of the protocol in past periods. In this example, total risk score 514(1) may include a cumulative rule risk weight, an average rule risk weight, and a standard deviation of rule risk weights. In this example, the cumulative rule risk weight may indicate a combined weighted risk for a number of different rules.

Similarly, in one example, security policy 228(2) may include advanced analytics rules that apply more behavioral context to the risk assessment. For example, when detecting the previous suspicious protocol, calculation module 218 may evaluate user activity before and after the suspicious protocol as part of security policy 228(2) to provide more context for suspicious protocol. In this example, similar descriptive statistics may be calculated by advanced analytics rule risk weight. For example, total risk score 514(2) may include a cumulative advanced analytics rule risk weight, an average advanced analytics rule risk weight, and a standard deviation of advanced analytics rule risk weights.

In some embodiments, machine learning model 230 may include a behavioral model including one or more unsupervised models with baseline risk weights, wherein each unsupervised model may be trained using historical behaviors within a predetermined time period, to predict a confidence interval of a security risk for a current time period. For example, an unsupervised model may include a time series generalized additive model. Additionally or alternatively, machine learning model 230 may include a behavioral model including one or more supervised models with probabilistic risk weights, wherein each supervised model may be trained using labeled training data within the predetermined time period, to predict a probability of the security risk for the current time period. For example, a supervised model may include a random forest with boost. In these embodiments, machine learning model 230 may be pre-trained and stored to use for future predictions. In other embodiments, a combination of one or more unsupervised models and one or more supervised models may be used. In some examples, machine learning model 230 may be hosted on a server, such as in the cloud, and may be accessed by computing device 202 over network 204 to calculate risk scores. In other examples, machine learning model 230 may be stored on computing device 202, with a version of machine learning model 230 stored on each managed endpoint device for faster access.

Figure 4:
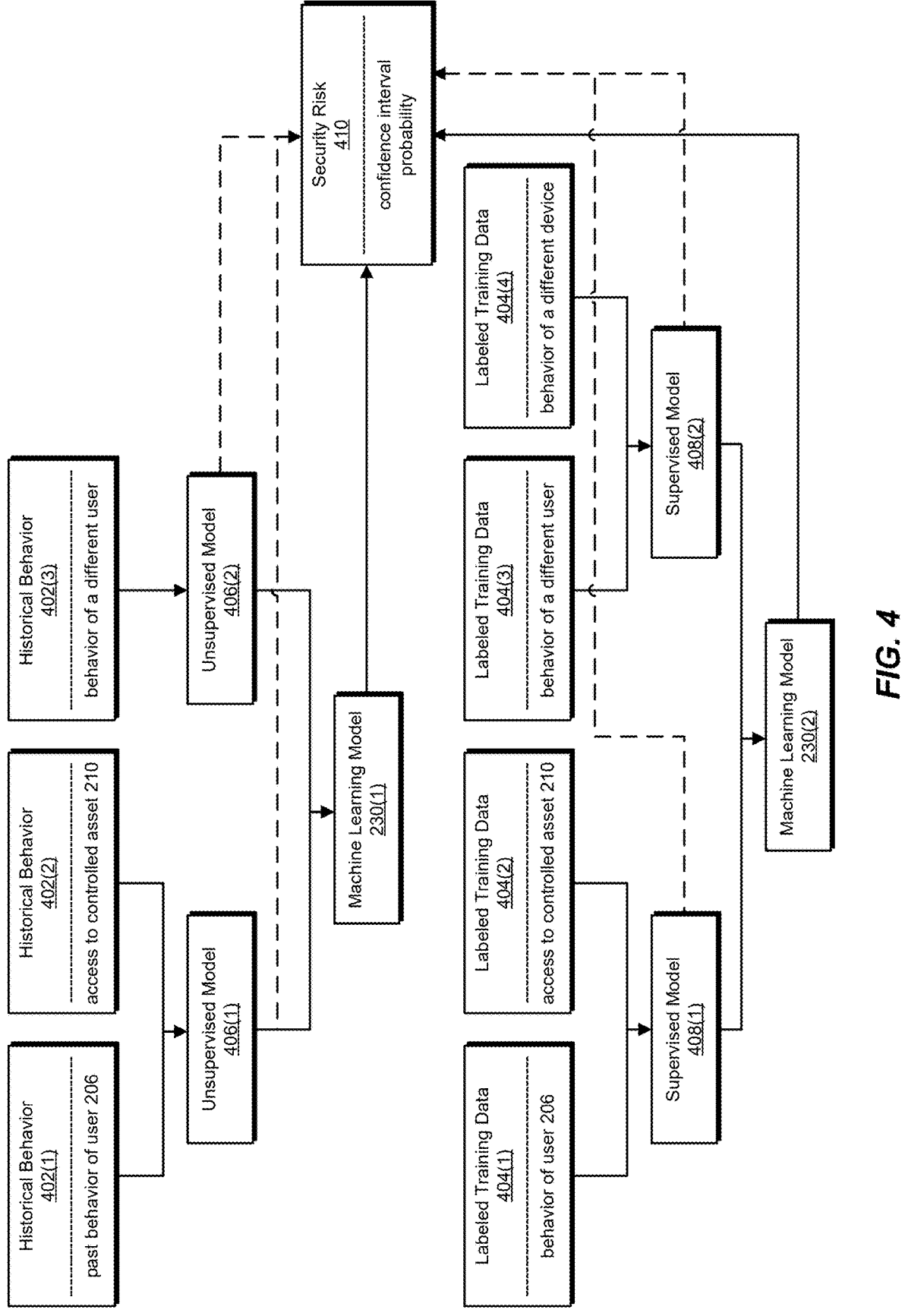
FIG. 4 is a block diagram of training example machine learning models.

FIG. 4 is a block diagram of a training of example machine learning models, in accordance with various embodiments. As shown in FIG. 4, historical behaviors 402(1)-(3) may be used to train unsupervised models 406 (1)-(2). In this example, historical behaviors 402(1)-(3) may include past behaviors of user 206, past access to controlled asset 210, behaviors of other users, and/or any other suitable historical record. Additionally or alternatively, historical behaviors 402(1)-(3) may include a historical use of computing device 202, a historical use of a different computing device, which may include a similar device to computing device 202, and/or a historical access to a different controlled asset, which may be similar to controlled asset 210. In the example of FIG. 4, machine learning model 230(1) may then be trained as a combination of unsupervised models 406(1)-(2). In alternate examples, each of unsupervised models 406(1)-(2) may represent a separate machine learning model that may be used to evaluate a security risk 410.

Similar to the above, machine learning model 230(1) of FIG. 6 may include unsupervised machine learning, such as an unsupervised model derived from the behavior of an endpoint device within an analytical time period. In these examples, each unsupervised model may be built for every target variable mapped from a relevant set of tactics, techniques, or procedure classifications. By querying a historical log associated with computing device 202 or other devices for a specific target variable, the disclosed methods may derive a relevant set of features to train machine learning model 230(1). For example, a historical log of 6 months may be divided into historical data for different devices in shorter periods of time. Additionally, sequential and consecutive queries may use a summary function for the analytical time period to model the target variable and selected features over time. In this example, machine learning model 230(1) may then be used to predict risk values for a current time period, such as current time period 502, and a confidence interval may be calculated for the prediction. For example, machine learning model 230(1) of FIG. 4 may predict a confidence interval of security risk 410. In these examples, total risk score 514(3) may include a true or false condition indicating whether a calculated risk score is within the confidence interval and descriptive statistics to indicate changes in the true or false condition over time. In these examples, total risk score 514(3) may include a cumulative baseline risk weight, an average baseline risk weight, and a standard deviation of baseline risk weights.

In the example of FIG. 4, labeled training data 404(1)-(4) may be used to train supervised models 408(1)-(2). In this example, labeled training data 404(1)-(4) may include similar data to historical behaviors 401(2)-(3), such as past behaviors of user 206, past access to controlled asset 210, behaviors of other users, and behaviors or other devices. In the example of FIG. 4, machine learning model 230(2) may then be trained as a combination of supervised models 408(1)-(2). In alternate examples, each of supervised models 408(1)-(2) may represent a separate machine learning model that may be used to evaluate security risk 410.

Similar to the above, machine learning model 230(2) of FIG. 6 may include supervised machine learning, such as a supervised model derived from the behavior of an endpoint device within an analytical time period. In these examples, each supervised model may be built for every target variable mapped from a relevant set of tactics, techniques, or procedure classifications. To train machine learning model 230(2), labeled training data associated with samples of similar endpoints and a specific target variable may be used. By querying a historical log associated with computing device 202 or other devices for a specific target variable, the disclosed methods may derive a relevant set of features to train machine learning model 230(2). For example, a feature may include a binary value to indicate whether a behavior is malicious or not, and machine learning model 230(2) may be trained on the historical log to classify the feature. Additionally, sequential and consecutive queries may use a summary function for the analytical time period to model the target variable and selected features over time. In this example, machine learning model 230(2) may then be used to predict a probability of a malicious target variable for a current time period, such as current time period 502, with higher probabilities indicating greater likelihood of malicious behavior. For example, machine learning model 230 (2) of FIG. 4 may predict a probability of security risk 410. In these examples, total risk score 514(4) may include a true or false condition indicating whether a target variable meets or exceeds a probability threshold and descriptive statistics to indicate changes in the true or false condition over time. In these examples, total risk score 514(4) may include a cumulative probabilistic risk weight, an average probabilistic risk weight, and a standard deviation of probabilistic risk weights.

In the example of FIG. 6, each type of analysis may result in a different total risk score. Additionally, the processing or training of each analytical method may be conducted on a server or in the cloud. For example, a data schema may be created to retain essential metadata associated with processing each analytical method, and intermediate metrics of each analytical method may be retained for a period of time. In this example, updated risk score 232 may be stored on computing device 202 to reduce a retrieval latency for immediate use in evaluating user 206.

In some examples, calculation module 218 may periodically calculate updated risk score 232 by using one or more ensemble methods to calculate an ensemble risk score, wherein an ensemble method includes a combination of security policy 228 and machine learning model 230. By using an ensemble method, or a combination of multiple learning methods, the disclosed methods may enable more accurate risk assessment than by using a single method. For example, security risk 410 of FIG. 4 may be separately evaluated using each method or by any combination or variation of machine learning models 230(1)-(2), unsupervised models 406(1)-(2), and/or supervised models 408(1)-(2). Similarly, updated risk score 232 of FIG. 2 may be calculated with one or more machine learning models in combination with one or more security policies to more accurately determine the risk from user 206. In these examples, the ensemble method may include using one or more machine learning models in parallel or in series with one or more security policies and/or may include a combination of techniques from one or more machine learning models in combination with techniques from one or more security policies.

Returning to FIG. 1, at step 150, one or more of the systems described herein may perform a security action in response to determining the updated risk score exceeds the predetermined threshold. For example, a security module 220 may, as part of computing device 202 in FIG. 2, perform a security action 236 in response to determining updated risk score 232 exceeds predetermined threshold 226.

The systems described herein may perform step 150 in a variety of ways. In some embodiments, and as illustrated in FIG. 2, security module 220 may perform security action 236 by terminating access to controlled asset 210, terminating secure user session 240, and/or restricting a use of controlled asset 210. Additionally or alternatively, security module 220 may restrict a use of a different resource, block user 206 of computing device 202, block a process of computing device 202, quarantine computing device 202, update a security report, and/or alert an administrator of system 200. In these embodiments, security module 220 may restrict or block use of any resource of computing device 202 and/or a device connected through network 204. In other words, security module 220 may dynamically suspend or terminate access privilege when risk scores exceed an acceptable risk threshold. In some examples, security agent 222 may use policy guidance and decision rules to determine what actions to take for security action 236. For example, security action 236 may be a broad restriction, such as restricting access to storage or imposing a network quarantine, or may be a narrow restriction, such as restricting access to a specific file or network. Other examples of security action 236 may include blocking a user account, blocking an endpoint device, blocking an application, and/or any other suitable security actions to mitigate risk.

Figure 7:
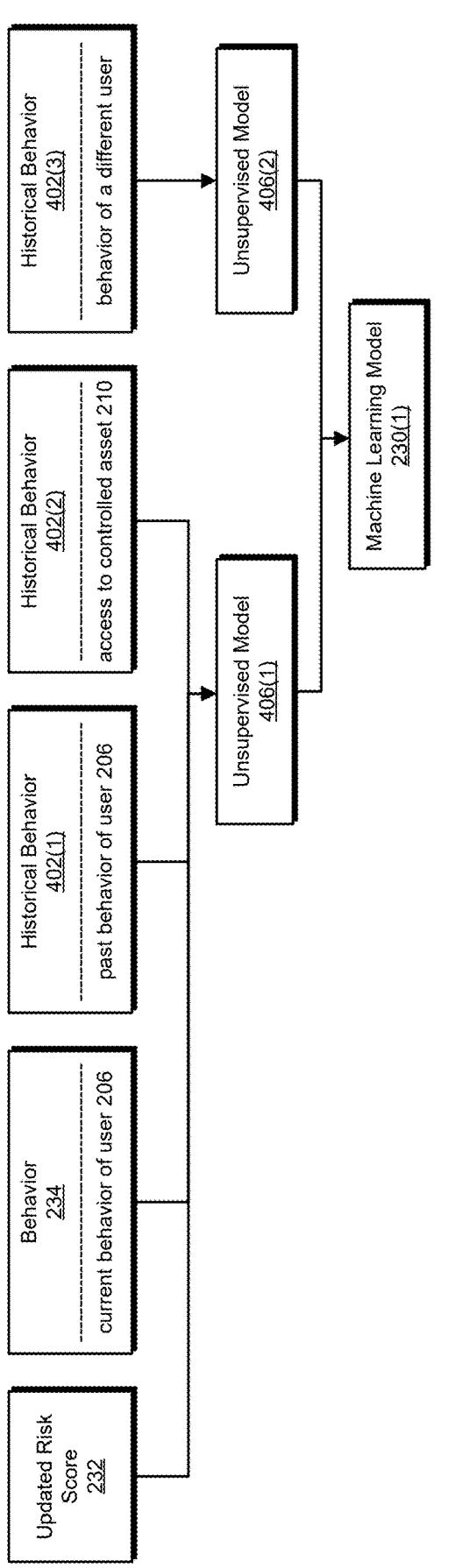
FIG. 7 is a block diagram of an example retraining of a machine learning model.

In some embodiments, the systems and methods disclosed herein may further include retraining machine learning model 230 using updated risk score 232 and behavior 234 of user 206. In these embodiments, behavioral data may be logged during secure user session 240, and user activity may be recorded as historical data for future predictions. In these embodiments, machine learning model 230 may be retrained periodically and/or after logging new data. In the example of FIG. 7, updated risk score 232 and behavior 234 may be added to historical behaviors 402(1)-(2) to retrain unsupervised model 406(1). In this example, retrained unsupervised model 406(1) and unsupervised model 406(2) may be used to create updated machine learning model 230(1). In other examples, a security risk or security event may be logged to confirm whether updated risk score 232 is accurate for behavior 234, and machine learning model 230 may be retrained for better accuracy.

As explained above in connection with method 100 in FIG. 1, the disclosed systems and methods may, by leveraging historical and behavioral data for multiple users and/or devices, provide more accurate training of machine learning models to detect risk for managed endpoint devices. By evaluating data for both current and past time periods, the disclosed systems and methods may also detect behavioral trends over time for more stable predictions. Additionally, by combining both static analysis of security policies and rules and dynamic analysis of user behavior through machine learning, the systems and methods described herein may create more robust predictions. Furthermore, the systems and methods described herein build on traditional authentication methods to provide an additional layer of control that dynamically evaluates security risk in real time. Thus, the disclosed systems and methods may improve over traditional methods of zero trust access control of assets.

In some embodiments, a computer-implemented method for access control includes detecting, by a security agent of a computing device, a request by a user of the computing device for access to a controlled asset; authenticating, by the security agent, the user in response to the request; granting, by the security agent, access to the controlled asset based on determining that an initial risk score for the authenticated user does not exceed a predetermined threshold; periodically calculating, by the security agent using at least one security policy and at least one machine learning model, an updated risk score of the authenticated user based on a behavior of the user; and performing a security action in response to determining the updated risk score exceeds the predetermined threshold.

In some embodiments, the controlled asset includes one or more of: an application; a storage; a network; a process of the computing device; or a remote resource.

In some embodiments, authenticating the user includes: authenticating an identity of the user; and identifying at least one authorized privilege associated with the identity of the user.

In some embodiments, the identity of the user includes one or more of: a personal identity of the user; an identity of the computing device used by the user; or a process identifier associated with the user using the computing device.

In some embodiments, determining that the initial risk score does not exceed the predetermined threshold includes: calculating the initial risk score using the at least one security policy and the at least one machine learning model; combining a result of the at least one security policy and a result of the at least one machine learning model; and comparing the combination with the predetermined threshold.

In some embodiments, granting access to the controlled asset includes establishing a secure user session for the user on the computing device to access the controlled asset.

In some embodiments, periodically calculating the updated risk score includes: monitoring the behavior of the user during the secure user session; and dynamically updating the initial risk score based on the behavior of the user during the secure user session.

In some embodiments, monitoring the behavior of the user includes one or more of: monitoring a usage of an application of the computing device; monitoring a usage of a storage of the computing device; monitoring a usage of a network of the computing device; monitoring a usage of a process of the computing device; or monitoring a usage of a remote resource.

In some embodiments, periodically calculating the updated risk score includes: calculating, for each of the at least one security policy and the at least one machine learning model, a cumulative risk weight for the behavior of the user during a current time period, an average over a shifting time period, and a standard deviation over a longer time period; combining, for each of the at least one security policy and the at least one machine learning model, the cumulative risk weight, the average, and the standard deviation into a total risk score; and combining each total risk score into the updated risk score.

In some embodiments, the at least one security policy includes one or more of: a set of rules for risk assessment; or advanced analytics that apply behavioral context to the set of rules for risk assessment.

In some embodiments, the at least one machine learning model includes one or more of: a behavioral model comprising multiple unsupervised models with baseline risk weights, wherein each unsupervised model is trained using historical behaviors within a predetermined time period, to predict a confidence interval of a security risk for a current time period; or a behavioral model comprising multiple supervised models with probabilistic risk weights, wherein each supervised model is trained using labeled training data within the predetermined time period, to predict a probability of the security risk for the current time period.

In some embodiments, periodically calculating the updated risk score includes using an ensemble method to calculate an ensemble risk score, wherein the ensemble method includes a combination of the at least one security policy and the at least one machine learning model.

In some embodiments, performing the security action includes one or more of: terminating access to the controlled asset; terminating a user session; restricting a use of the controlled asset; restricting a use of a different resource; blocking the user of the computing device; blocking a process of the computing device; quarantining the computing device; updating a security report; and alerting an administrator.

In some embodiments, the method further includes retraining the at least one machine learning model using the updated risk score and the behavior of the user.

In some embodiments, a system for access control includes: a detection module, stored in memory, that detects, by a security agent of a computing device, a request by a user of the computing device for access to a controlled asset; an authentication module, stored in memory, that authenticates, by the security agent, the user in response to the request; a grant module, stored in memory, that grants, by the security agent, access to the controlled asset based on determining that an initial risk score for the authenticated user does not exceed a predetermined threshold; a calculation module, stored in memory, that periodically calculates, by the security agent using at least one security policy and at least one machine learning model, an updated risk score of the authenticated user based on a behavior of the user; a security module, stored in memory, that performs a security action in response to determining the updated risk score exceeds the predetermined threshold; and at least one processor that executes the detection module, the authentication module, the grant module, the calculation module, and the security module.

In some embodiments, the grant module determines that the initial risk score does not exceed the predetermined threshold by: calculating the initial risk score using the at least one security policy and the at least one machine learning model; combining a result of the at least one security policy and a result of the at least one machine learning model; and comparing the combination with the predetermined threshold.

In some embodiments, the grant module grants access to the controlled asset by establishing a secure user session for the user on the computing device to access the controlled asset.

In some embodiments, the calculation module periodically calculates the updated risk score by: monitoring the behavior of the user during the secure user session; and dynamically updating the initial risk score based on the behavior of the user during the secure user session.

In some embodiments, wherein the calculation module periodically calculates the updated risk score by: calculating, for each of the at least one security policy and the at least one machine learning model, a cumulative risk weight for the behavior of the user during a current time period, an average over a shifting time period, and a standard deviation over a longer time period; combining, for each of the at least one security policy and the at least one machine learning model, the cumulative risk weight, the average, and the standard deviation into a total risk score; and combining each total risk score into the updated risk score.

In some embodiments, a non-transitory computer-readable medium includes one or more computer-executable instructions that, when executed by at least one processor of a computing device, cause the computing device to: detect, by a security agent of the computing device, a request by a user of the computing device for access to a controlled asset; authenticate, by the security agent, the user in response to the request; grant, by the security agent, access to the controlled asset based on determining that an initial risk score for the authenticated user does not exceed a predetermined threshold; periodically calculate, by the security agent using at least one security policy and at least one machine learning model, an updated risk score of the authenticated user based on a behavior of the user; and perform a security action in response to determining the updated risk score exceeds the predetermined threshold.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method for access control, the method comprising:

detecting, by a security agent of a computing device, a request by a user of the computing device for access to a controlled asset;

authenticating, by the security agent, the user in response to the request;

granting, by the security agent, access to the controlled asset based on determining that an initial risk score for the authenticated user does not exceed a predetermined threshold;

periodically calculating, by the security agent using at least one security policy and at least one machine learning model, an updated risk score of the authenticated user based on a behavior of the user; and performing a security action to mitigate a security risk associated with the user in response to determining the updated risk score exceeds the predetermined threshold;

wherein periodically calculating the updated risk score comprises:

calculating, for each of the at least one security policy and the at least one machine learning model, a cumulative risk weight for the behavior of the user during a current time period, an average risk weight over a shifting time period, and a standard deviation of risk weights over an extended time period;

combining, for each of the at least one security policy and the at least one machine learning model, the cumulative risk weight, the average risk weight, and the standard deviation into a respective total risk score; and combining each of the respective total risk scores into the updated risk score; and wherein the extended time period and the shifting time period are longer than the current time period and the extended time period is longer than the shifting time period.

2. The method of claim 1, wherein the controlled asset comprises at least one of:

an application;

a storage;

a network;

a process of the computing device; or a remote resource.

3. The method of claim 1, wherein authenticating the user comprises:

authenticating an identity of the user; and identifying at least one authorized privilege associated with the identity of the user.

4. The method of claim 3, wherein the identity of the user comprises at least one of:

a personal identity of the user;

an identity of the computing device used by the user; or a process identifier associated with the user using the computing device.

5. The method of claim 1, wherein determining that the initial risk score does not exceed the predetermined threshold comprises:

calculating the initial risk score using the at least one security policy and the at least one machine learning model;

combining a result of the at least one security policy and a result of the at least one machine learning model; and comparing the combination with the predetermined threshold.

6. The method of claim 1, wherein granting access to the controlled asset comprises establishing a secure user session for the user on the computing device to access the controlled asset.

7. The method of claim 6, wherein periodically calculating the updated risk score comprises:

monitoring the behavior of the user during the secure user session; and dynamically updating the initial risk score based on the behavior of the user during the secure user session.

8. The method of claim 7, wherein monitoring the behavior of the user comprises at least one of:

monitoring a usage of an application of the computing device;

monitoring a usage of a storage of the computing device;

monitoring a usage of a network of the computing device;

monitoring a usage of a process of the computing device; or monitoring a usage of a remote resource.

9. The method of claim 1, wherein the at least one security policy comprises at least one of:

a set of rules for risk assessment; or advanced analytics that apply behavioral context to the set of rules for risk assessment.

10. The method of claim 1, wherein the at least one machine learning model comprises at least one of:

a behavioral model comprising multiple unsupervised models with baseline risk weights, wherein each unsupervised model is trained using historical behaviors within a predetermined time period, to predict a confidence interval of a security risk for the current time period; or a behavioral model comprising multiple supervised models with probabilistic risk weights, wherein each supervised model is trained using labeled training data within the predetermined time period, to predict a probability of the security risk for the current time period.

11. The method of claim 1, wherein performing the security action comprises at least one of:

terminating access to the controlled asset;

terminating a user session;

restricting a use of the controlled asset;

restricting a use of a different resource;

blocking the user of the computing device;

blocking a process of the computing device;

quarantining the computing device;

updating a security report; and alerting an administrator.

12. The method of claim 1, further comprising retraining the at least one machine learning model using the updated risk score and the behavior of the user.

13. A system for access control, the system comprising:

at least one processor; and a memory having stored thereon instructions executable by the processor to cause the system to perform one or more operations, the instructions comprising:

a detection module, stored in memory, that causes a security agent of a computing device to detect a request by a user of the computing device for access to a controlled asset;

an authentication module, stored in memory, that causes the security agent to authenticate the user in response to the request;

a grant module, stored in memory, that causes the security agent to grant the authenticated user access to the controlled asset based on determining that an initial risk score for the authenticated user does not exceed a predetermined threshold;

a calculation module, stored in memory, that causes the security agent to periodically calculate, using at least one security policy and at least one machine learning model, an updated risk score of the authenticated user based on a behavior of the user; and a security module, stored in memory, that causes the security agent to perform a security action to mitigate a security risk associated with the user in response to determining the updated risk score exceeds the predetermined threshold;

wherein the at least one processor executes instructions stored in the memory comprising the detection module, the authentication module, the grant module, the calculation module, and the security module;

wherein the calculation module periodically calculates the updated risk score by:

calculating, for each of the at least one security policy and the at least one machine learning model, a cumulative risk weight for the behavior of the user during a current time period, an average risk weight over a shifting time period, and a standard deviation of risk weights over an extended time period;

combining, for each of the at least one security policy and the at least one machine learning model, the cumulative risk weight, the average risk weight, and the standard deviation into a respective total risk score; and combining each of the respective total risk scores into the updated risk score; and wherein the extended time period and the shifting time period are longer than the current time period and the extended time period is longer than the shifting time period.

14. The system of claim 13, wherein the grant module determines that the initial risk score does not exceed the predetermined threshold by:

calculating the initial risk score using the at least one security policy and the at least one machine learning model;

combining a result of the at least one security policy and a result of the at least one machine learning model; and comparing the combination with the predetermined threshold.

15. The system of claim 13, wherein the grant module grants access to the controlled asset by establishing a secure user session for the user on the computing device to access the controlled asset.

16. The system of claim 15, wherein the calculation module periodically calculates the updated risk score by:

monitoring the behavior of the user during the secure user session; and dynamically updating the initial risk score based on the behavior of the user during the secure user session.

17. A non-transitory computer-readable medium comprising one or more computer-executable instructions that, when executed by at least one processor of a computing device, cause the computing device to:

detect, by a security agent of the computing device, a request by a user of the computing device for access to a controlled asset;

authenticate, by the security agent, the user in response to the request;

grant, by the security agent, access to the controlled asset based on determining that an initial risk score for the authenticated user does not exceed a predetermined threshold;

periodically calculate, by the security agent using at least one security policy and at least one machine learning model, an updated risk score of the authenticated user based on a behavior of the user; and perform a security action to mitigate a security risk associated with the user in response to determining the updated risk score exceeds the predetermined threshold;

wherein periodically calculating the updated risk score comprises:

calculating, for each of the at least one security policy and the at least one machine learning model, a cumulative risk weight for the behavior of the user during a current time period, an average risk weight over a shifting time period, and a standard deviation of risk weights over an extended time period;

combining, for each of the at least one security policy and the at least one machine learning model, the cumulative risk weight, the average risk weight, and the standard deviation into a respective total risk score; and combining each of the respective total risk scores into the updated risk score; and wherein the extended time period and the shifting time period are longer than the current time period and the extended time period is longer than the shifting time period.

* * * * *